United States Patent Office 3,229,018
Patented Jan. 11, 1966

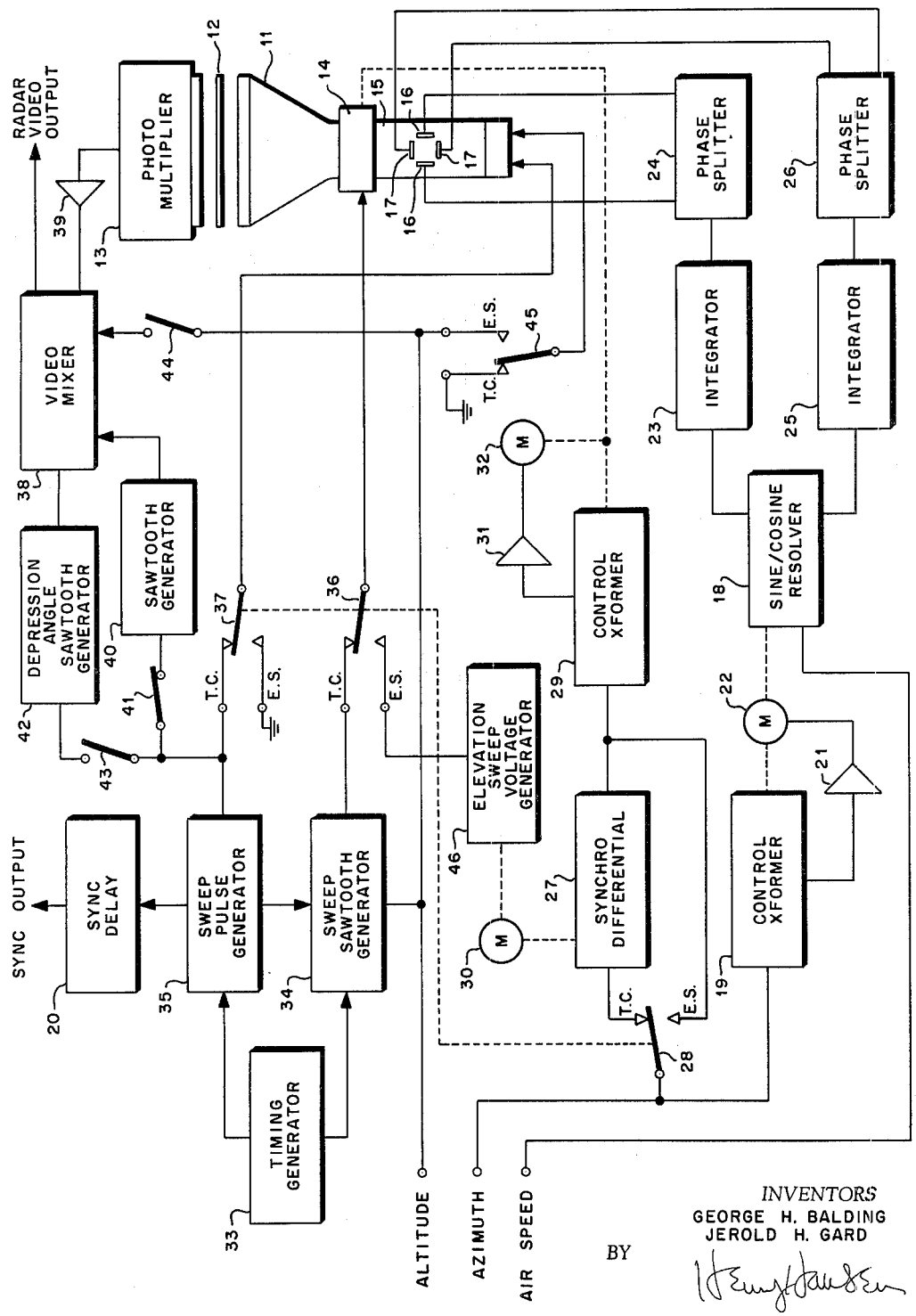

3,229,018
RADAR SIMULATOR
George H. Balding, Fremont, and Jerold H. Gard,
Mountain View, Calif., assignors, by mesne assignments, to the United States of America as represented by the Secretary of the Navy
Filed Aug. 22, 1963, Ser. No. 303,975
2 Claims. (Cl. 35—10.4)

This invention relates to a simulator and more particularly to a radar simulator for simulating the signals of a radar receiver.

The development of radar has been a great advance in navigational systems. Particularly today elaborate radar systems are used in aircraft as navigation aids for displaying radar derived terrain clearance and range or azimuth information on a conventional cathode ray tube. One such system is disclosed in co-pending application Serial No. 126,436 of George H. Balding for Radar Display Converter. Used in conjunction with aircraft radar systems, this radar display converter displays information as presented in either of two major modes:

(1) Terrain clearance.
(2) E-scope.

In the terrain clearance mode of operation the radar display converter receives information consisting of azimuth and range data from the aircraft radar equipment. This radar derived data is processed and presented on the cathode ray tube display as a series of azimuth terrain profiles where each profile displayed appears at a different elevation angle. In the E-scope mode of operation, the display provides a presentation to the pilot of range vs. elevation at a fixed heading or azimuth. In the terrain clearance mode of operation the display provides a series of azimuth terrain profiles in which each profile displayed appears at a different elevation angle. The difference between the two displays is essentially that the terrain clearance display provides information of sectors or slices of terrain while the E-scope display provides information in a single direction.

The purpose of the present invention is to provide a terrain clearance and E-scope mode radar simulator for providing radar video data to the radar display converter in the same form and in place of the signals as received from the aircraft radar system. This invention further includes means for simulating radar data received from a system having a horizontal scan only.

The present invention contemplates the use of a flying spot scanner tube of the electrostatically deflected type having an electro-magnetic deflection yoke to provide video information for display on a cathode ray tube which is simulative of the video information obtained by radar system of an aircraft in actual flight. In other words, the simulator of the present invention would provide to the radar display converter such simulated video information as would cause a picture to appear on the cathode ray tube of the radar display converter which is similar to that which would be caused by real video information from an aircraft radar system.

In the radar simulator of the present invention the flying spot scanner tube principle is used to provide a simulated radar antenna scan on a map film slide made up of contour levels of varying transparency with each shade representing a different elevation. As the scan and beam move across the face of the tube, light is allowed to pass through the map film slide. The degree of transparency of each elevation and the brightness of the simulated radar sweep determine the input to a photo-multiplier tube which converts this light information into an electrical signal.

Therefore it is an object of the present invention to provide a radar simulator for generating video signals simulative of the video signals as received from an aircraft radar system.

Another object of the present invention is to provide a radar simulator which simulates radar information received from an aircraft radar system for ultimate visual display of the simulated radar information which is of the same form as the display of real radar information.

A further object of the present invention is to provide a radar simulator for simulating the video signals of a radar system which scans in azimuth only, in elevation only, or in azimuth and elevation together.

With these and other objects in view as will hereinafter more fully appear, and which will be more particularly pointed out in the appended claims, reference is now made to the following description taken in connection with the accompanying drawings in which:

The figure illustrates in block diagram form an embodiment of the present invention.

A flying spot scanner tube 11 is used to provide a simulated radar antenna scan on a map film slide 12. A light sensitive photo-multiplier tube which is placed so that it is viewing the face of the flying spot scanner tube 11 and the interposed map film slide 12, produces an output signal that is proportional to the transparency of the slide and brightness of the electron beam. Flying spot scanner tube 11 has an electromagnetic deflection yoke 14 disposed on the neck 15. Flying spot scanner tube 11 is equipped with electrostatic deflection plates 17 and 16 which provide for horizontal and vertical displacement of the electron beam, respectively.

The electrostatic deflection plates 16 and 17 are utilized to position a spot on the face of the tube 11 which is analogous to the aircraft position. In operation, aircraft azimuth and airspeed are furnished from the aircraft as inputs into the present system. More specifically, a voltage proportional to airspeed is applied to the stator of a sine cosine synchro resolver 18. The rotor of sine cosine synchro 18 is positioned in accordance with azimuth or heading of the aircraft by means of the servo loop comprising control transformer 19, amplifier 21 and motor 22. Control transformer 19 receives a voltage proportional to the azimuth or heading of the aircraft which drives motor 22 after amplification in amplifier 21. The mechanical output of motor 22 positions the rotor of sine cosine resolver 18 in accordance with heading of the aircraft. Motor 22 and control transformer 19 are connected in a conventional feedback arrangement whereby the output of control transformer 19 is nulled when the rotor of sine cosine resolver 18 has been positioned. Sine cosine resolver provides two outputs each being one of the rectangular coordinates of the aircraft velocity. The aircraft velocity in the $x$ direction $V_x$ is integrated by integrator 23, passed through phase splitter 24 and applied to the horizontal deflection plates 17 of flying spot scanner tube 11 whereby the spot on the face of the flying spot scanner tube 11 simulates the movement of the aircraft in the $x$ direction. Similarly, the velocity component of the aircraft in the $y$ direction is integrated and split in phase in integrator 25 and phase splitter 26 and applied to the vertical deflection plates 16 of flying spot scanner tube 11. The electron beam of the flying spot scanner tube 11 is therefore moved across the face of the tube in accordance with actual aircraft position.

The azimuth signal is also fed to the rotor winding of synchro differential 27 through switch 28. Motor 30 is geared to provide a washing machine action that mechanically oscillates the rotor of the synchro differential 27 to simulate the 60 degree antenna azimuth sweep centered on the azimuth heading of the aircraft. The stator winding of the synchro differential 27 provides the input for the yoke servo loop comprising control transformer 29, amplifier 31 and motor generator 32. Yoke 14 is mechanically connected to the output of motor generator 32 and is thus caused to oscillate plus or minus 30 degrees on each side of a line simulative of the heading of the aircraft. A conventional feedback arrangement is connected between the output of motor generator 32 and control transformer 29.

The servo system thus described performs mechanical movement necessary to simulate the azimuth scan of the antenna in addition to providing movement of the electron beam to simulate the track and position of the aircraft. The vertical or elevation scan is obtained by means of the electronic system described hereinbelow.

Timing generator 33 which provides a 1200 c.p.s. timing pulse as output, is connected to sawtooth generator 34 and sweep pulse generator 35. Sweep sawtooth generator 34 is triggered by the timing pulses from timing generator 33 to provide a sweep sawtooth to the electromagnetic deflection yoke and is effective to sweep the beam of the flying spot scanner vertically. The combined effect of the azimuth sweep by mechanical movement of the yoke as previously described and the electronic vertical or elevation sweep is to produce a fan-like sweep on the face of flying spots scanner tube 11. The output of sweep sawtooth generator 34 is connected to yoke 14 through switch 36 in the position shown.

Sweep pulse generator 35 is connected to the grid of flying spot scanner tube 11 through switch 37. Sweep pulse generator 35 provides blanking pulses to flying spot scanner tube 11 to blank out retrace of the sweep of sweep sawtooth generator 34.

Video mixer 38 receives the video signal from the photomultiplied tube 13 through video amplifier 39.

Sweep pulse generator 35 is connected to range sawtooth generator 40 through switch 41. Video mixer 38 receives the output from range sawtooth generator 40. Alternately sweep pulse generator 35 may be connected to depression angle sawtooth generator 42 through a switch 43. The output of depression angle sawtooth generator 42 is connected to video mixer 38.

With switches 28, 36, 37, 43 and 41 in the position shon, the radar simulator of the present invention is in the terrain clearance mode of operation, that is, it is simulating the radar signals that would be derived from a radar system in an aircraft which is sweeping in the horizontal and vertical directions. Such a sweep of the antenna of the aicraft radar system carves out a sector of the terrain which varies 30 degrees to one side or the other of the azimuth (a horizontal scan) while at the same time scanning in a vertical direction.

The combination of the sweep sawtooth generator pulses applied to yoke 14 and the rotation of the yoke 14 back and forth about the fixed azimuth line causes a fan-like sweep to appear on the face of flying spot scanner tube 11 with the vertex continually moving across the face of the screen in a direction in accordance with the direction and speed of the aircraft. Map film slide 12 which is made up of contour levels of varying transparency with each shade representing a different elevation is disposed between the face of tube 11 and photo-multiplier tube 13. As the scan and beam move across the face of the flying spot scanner tube 11, light is allowed to pass through the scanner sector of the map film slide 12. Photo-multiplier tube 13 converts the light passing through map film slide 12 into an electrical signal which is amplified in video amplifier 39 and fed to video mixer 38 where it is mixed with a sawtooth voltage from range sawtooth generator 40 (as required by the radar display converter) and provided as the output of video mixer 38 as radar video.

For the situation where it is desired to simulate radar video signals which would be provided by an aircraft radar system which scans in azimuth only, that is, not in elevation or vertically, switch 41 would be opened and switch 43 closed. The depression angle sawtooth generator 42 is then triggered by sweep pulse generator 35 and provides as an input to video mixer 38 a sawtooth which is representative of a fixed depression angle for a given output. At the same time that switch 43 is closed, switch 44 is also closed providing a D.C. voltage representative of altitude as an input into video mixer 38. Thus for the situation of scan in azimuth only, video mixer 38 is provided with three signals composed of the depression angle tawtooth from depression angle sawtooth generator 42, the video signal from video amplifier 39 and an altitude sensitive D.C. level. Since the amplitude of the video signal from photo-multiplier tube 13 is proportional to the elevation of the terrain which the flying spot scanner tube beam is scanning and the depression angle sawtooth is proportional to a predetermined fixed radar depression angle, the intersection of these two signals produces a pulse which would occur at a time corresponding to the return echo time of a radar beam striking a target at the same range. Thus, in this situation the radar video output from video mixer 38 which is used for display in the radar display converter previously mentioned as a copending application, the visual display will be marked or identified as occurring at the particular depression angle even though the rest of the terrain clearance display may appear.

If it is desired to simulate radar video as would be received from a radar system which scans in elevation only and not in azimuth, switches 28, 36, 37, 45 must be changed to the position opposite from that shown. When switch 28 is changed, the oscillation of yoke 14 about neck 15 of flying spot scanner tube 11 is stopped and aligns only in accordance with azimuth. In other words, the rocking motion provided by the signal from synchro differential 27 is eliminated and change in azimuth only will cause yoke 14 to change relative to neck 15. For this reason the azimuth or horizontal scan is eliminated. At the same time the pulse output from sweep sawtooth generator 35 is disconnected from the yoke 14 thereby eliminating the need of blanking pulses from sweep pulse generator 34 to the grid of flying spot scanner tube 11. For that reason sweep pulse generator 34 is disconnected from flying spot scanner tube 11. In this situation, switch 36 connects elevation sweep voltage generator 46 to electromagnetic deflection yoke 14. Elevation sweep voltage generator 46 causes beam of the flying spot scanner tube 11 to sweep vertically at a much slower rate than sweep saw-tooth generator 34. For this reason elevation sweep voltage generator 46 may be any device of conventional design as would provide a linearly varying D.C. voltage.

For this elevation scan, only situation switch 45 is in the position opposite from that shown and connects D.C. voltage proportional to altitude to the grid of flying spot scanner tube 11. The purpose of this voltage is to provide an indication on the face of flying spot scanner tube 11 of the altitude of the aircraft. For this situation switch 44 also is open and video mixer 38 receives only the video signal from video amplifier 39 to provide the radar video output for application to the radar display converter.

For each of the three modes it is to be noted that the beam of flying spot scanner tube 11 is continuously moved across the face of flying spot scanner tube 11 and therefore across map film slide 12 in accordance with the actual position of the aircraft. This may be obvious from the fact that in all three modes or situations the signals representative of azimuth and airspeed are continuously converted into voltages representative of the aircraft position in the $x$ and $y$ directions and applied to the electrostatic deflection plates 16 and 17.

Obviously many modifications and variations of the present invention are possible in the light of the above teachings. It is therefore to be understood that within the scope of the appended claims the invention may be practiced otherwise than as specifically described.

What is claimed is:

1. A radar simulator for use in an aircraft, comprising in combination:

flying spot scanner tube means,
electrostatic deflection plate means disposed within said flying spot scanner tube means,
means connected to said electrostatic deflection plate means and providing a voltage thereto for moving an electron beam across the face of said flying spot scanner tube means in accordance with the velocity of the aircraft,
electromagnetic deflection yoke means disposed about the neck of said flying spot scanner tube means,
voltage source means connected to said electromagnetic deflection yoke means for continuously sweeping the electron beam in a vertical direction across the face of said flying spot scanner tube means,
photo multiplier tube means,
map film slide means of varying degrees of transparency disposed between the face of said flying spot scanner tube means and said photo multiplier tube means whereby said photo multiplier tube means provides an output signal that is proportional to the transparency of the map film slide means and the brightness of the electron beam,
video mixer means connected to said photo multiplier means,
depression angle sawtooth generator means connected to said video mixer means for providing a sawtooth pulse proportional to a simulated radar depression angle whereby the video output from said video mixer means includes a pulse occurring at a time corresponding to the particular range measured at said simulated radar depression angle.

2. A radar simulator for use in an aircraft, comprising in combination:
flying spot scanner tube means,
electrostatic deflection plate means disposed within said flying spot scanner tube means,
means connected to said electrostatic deflection plate means and providing a voltage thereto for moving an electron beam across the face of said flying spot scanner tube means in accordance with the velocity of the aircraft,
electromagnetic deflection yoke means rotatably disposed about the neck of said flying spot scanner tube means,
voltage source means connected to said electromagnetic deflection yoke means for continuously sweeping the electron beam in a vertical direction across the face of said flying spot scanner tube means,
mechanical means connected to said electromagnetic deflection yoke means rocking said electromagnetic deflection yoke means through an acute angle about the neck of said flying spot scanner tube means,
photo multiplier tube means,
map film slide means of varying degrees of transparency disposed between the face of said flying spot scanner tube means and said photo multiplier tube means providing an output signal that is proportional to the transparency of the map film slide means and the brightness of the electron beam,
video mixer means connected to said photo multiplier means,
depression angle sawtooth generator means connected to said video mixer means for providing a sawtooth pulse proportional to a simulated radar depression angle whereby the video output from said video mixer means includes a pulse occurring at a time corresponding to the particular range measured at said simulated radar depression angle.

References Cited by the Examiner
UNITED STATES PATENTS

| | | | |
|---|---|---|---|
| 2,523,328 | 9/1950 | Ranks | 343—5 |
| 2,636,166 | 4/1953 | Herbst | 343—6 |
| 2,701,352 | 2/1955 | Kingdon et al. | 343—5 |
| 2,720,039 | 10/1955 | Brown | 35—10.4 |
| 2,788,588 | 4/1957 | Lindley | 35—10.4 |
| 3,007,152 | 10/1961 | Simmons et al. | 343—5 |

CHESTER L. JUSTUS, *Primary Examiner.*

MAYNARD R. WILBUR, *Examiner.*